March 14, 1961 R. N. EICHORN 2,974,862
DIFFERENTIAL COUNTER
Filed Aug. 14, 1957 3 Sheets-Sheet 1

INVENTOR
ROBERT N. EICHORN
BY Donald F Voss
ATTORNEY

March 14, 1961 R. N. EICHORN 2,974,862
DIFFERENTIAL COUNTER
Filed Aug. 14, 1957 3 Sheets-Sheet 2

March 14, 1961  R. N. EICHORN  2,974,862
DIFFERENTIAL COUNTER

Filed Aug. 14, 1957  3 Sheets-Sheet 3

United States Patent Office 2,974,862
Patented Mar. 14, 1961

2,974,862

DIFFERENTIAL COUNTER

Robert N. Eichorn, Endicott, N.Y., assignor to International Business Machines Corporation, New York, N.Y., a corporation of New York Filed Aug. 14, 1957, Ser. No. 678,184

6 Claims. (Cl. 235—98)

This invention relates to counting mechanisms and particularly to a differential counter for counting articles.

A constant input drive moving at a rate relative to all article positions is supplied to the differential counter as well as an intermittent drive moving at a rate relative to the absence of an article in an article position whereby the output of the differential counter is derived by combining the constant input and the intermittent input differentially to represent the true number of articles. Movement of the intermittent drive is obtained through an escapement controllably operated by the presence and absence of articles in an article position.

In many machines for producing articles of manufacture, it is desirable to count the number of articles thereby produced, and further, in many instances, it is desirable to stack the produced articles in predetermined amounts and then initiate an indexing operation upon reaching this predetermined amount. However, some of the produced articles may be defective and therefore be rejected prior to reaching a stacking position. Hence the output of the machine would not necessarily be the same as the number of usable articles at the stacking position.

Of course, the manner of counting the articles may vary in accordance with the type and nature of the article being counted. In some instances the article itself will actuate the counter, whereas in other instances, the article will control the action of the counter. In this invention the article being counted controls the action of the counter rather than performing the actuation of it. This arrangement for counting is particularly suitable for counting fragile articles which could be damaged if required to actuate the counter, whereas damage would not occur to the article where the same only controls the action of the counter.

In general, the invention is particularly suitable for articles contained in a carrier having a predetermined number of article carrying positions. Hence by relating the article carrying positions to a constant input into one side of a differential counting mechanism having two inputs and one output and relating the number of articles absent in the carrying positions to an intermittent input into the other side of the differential counter and combining the two said inputs in a manner that the output equals the constant minus the intermittent input, the output will then represent the number of articles in the carrier and consequently, the actual output of usable articles. The intermittent input is controlled by an escapement mechanism constantly urged for movement but movable a predetermined amount only in the absence of an article. Since the control for the intermittent input releases power into the system and therefore does not induce any inertia effects, the counter can operate at very high speeds.

Accordingly, it is a principal object of this invention to provide for an improved mechanical counter to count articles whereby the articles being counted control the operation of the counter.

A further object of the invention is to provide for a mechanical counter which is substantially free from cumulative error.

Another object of the invention is to provide for a mechanical counter capable of accurately operating at very high speeds.

A further object of the invention is to provide for a mechanical counter having an improved life.

A further object of the invention is to provide for a mechanical counter having a constant additive input and an intermittent subtractive input for counting articles conveyed along a predetermined path whereby presence of an article maintains the subtractive input inoperative and absence of an article initiates action of the subtractive input.

A further object of the invention is to provide for a mechanical counter for counting articles having a constant additive input and a subtractive input powered by the constant additive input where the subtractive input is operable under the control of the presence and absence of an article.

A further object of the invention is to provide for a mechanical counter having a constant additive input and an intermittent subtractive input for counting articles conveyed by a carrier whereby the intermittent subtractive input is operable under the control of the absence of an article and operation of the control mechanism for the intermittent subtractive input is performed by the carrier.

Other objects of the invention will be pointed out in the following description and claims and illustrated in the accompanying drawings, which disclose, by way of examples, the principle of the invention and the best mode, which has been contemplated, of applying that principle.

Figure 1:
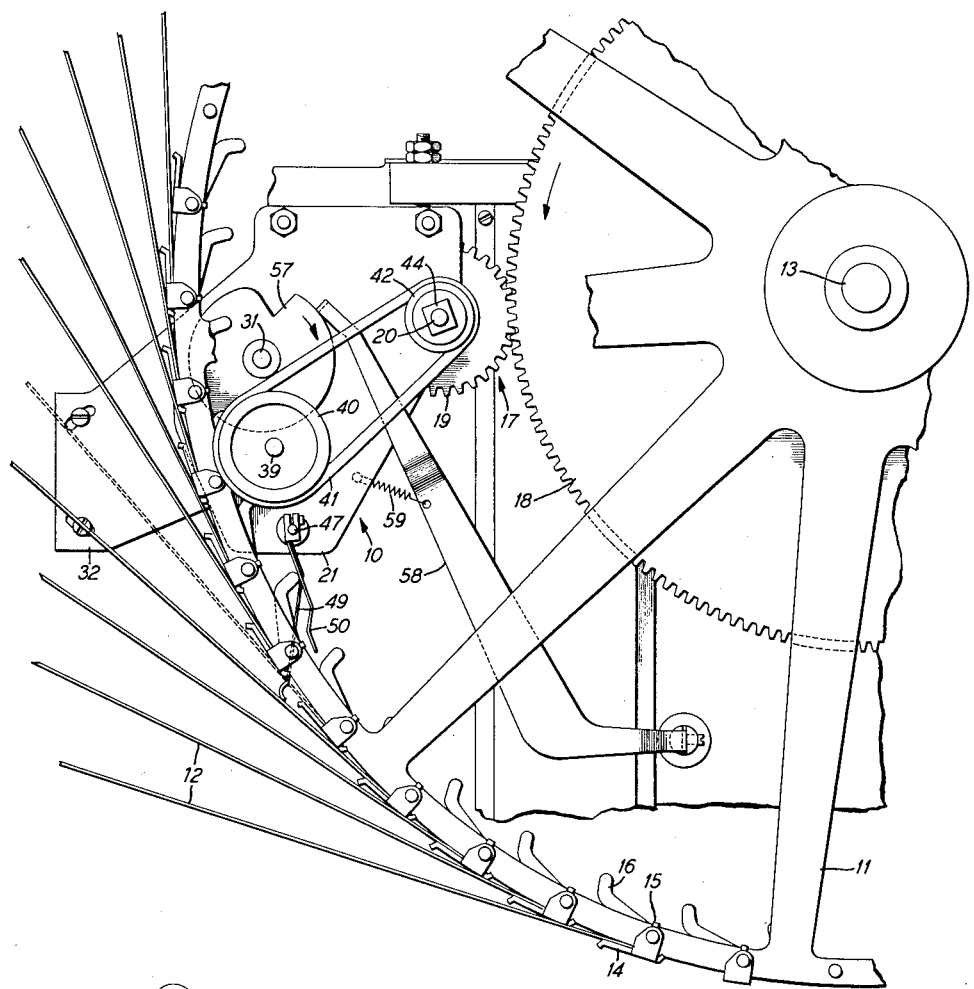
Fig. 1 represents diagrammatically a counting device embodying the invention.

Referring to the drawings and particularly to Fig. 1 for one application of the improved counter 10, there is shown an article carrier 11 especially adapted to receive tabulating cards 12 formed from a web of suitable material not shown, and to convey the same to a stacking position or platform, also not shown. A detailed description of the afore-mentioned mechanism is contained in Patent No. 2,294,718.

Briefly, the article carrier 11 in the form of a carrier wheel is fixed to a shaft 13 driven from a source not shown. The tabulating cards 12 so formed are retained on the carrier wheel 11 by clips 14 spaced equidistantly around the circumference of the carrier wheel 11. The clips 14 are urged by a spring 15 to hold the tabulating cards 12 against the outer periphery of the rim of the carrier wheel 11. An extension 16 of the clip 14 is adapted to engage a cam block, not shown, to pivot the clip 14 counterclockwise, thus releasing the card 12. It is the extension 16 which is used to actuate the mechanism controlling the intermittent input drive, to be described hereinafter. During the manufacturing of tabulating cards certain tests are made to detect defective cards and means are provided to reject any defective cards so detected. In this instance, defective cards are rejected from the carrier wheel 11. Hence the number of usable cards being produced cannot be calculated merely by noting the number of revolutions of the wheel and multiplying by the possible number of cards carried by the wheel per revolution.

The constant input to the counter 10 is supplied by a first speed reduction mechanism 17, including a gear 18 fixed to the shaft 13 which, as previously stated, carries the carrier wheel 11.

Figure 2:
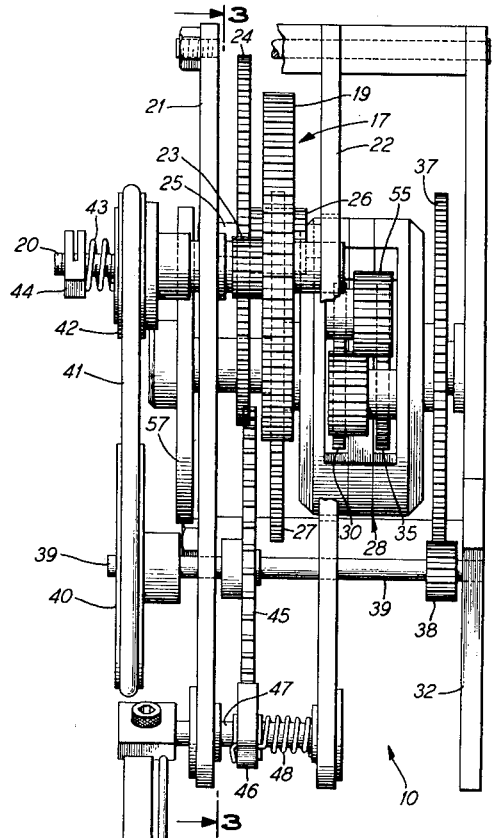
Fig. 2 is a right end elevation view of the counter of Fig. 1.
Figure 3:
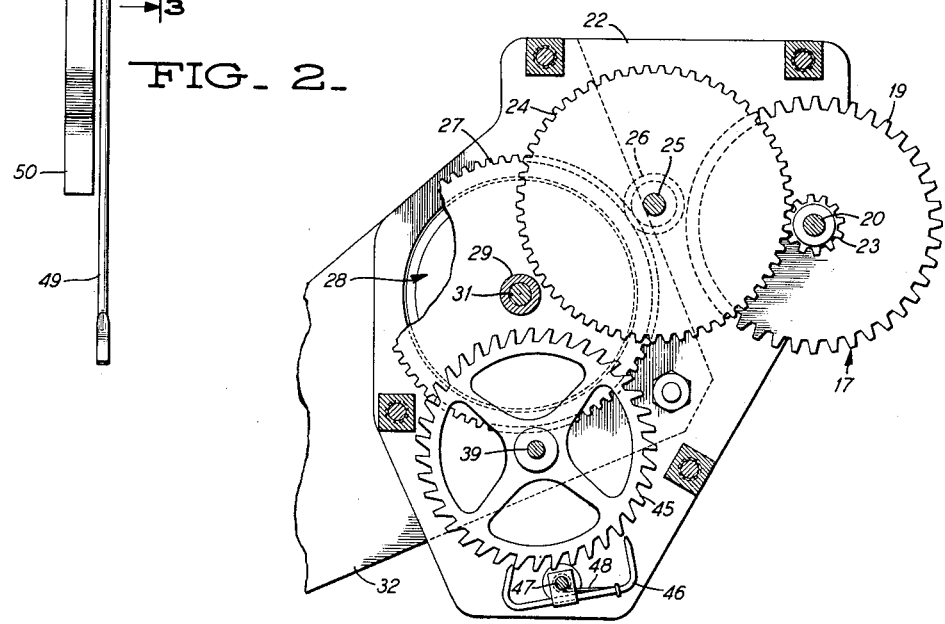
Fig. 3 is a sectional view taken along the line 3—3 in Fig. 2.

The gear 18 drives an input gear 19 fixed to a shaft 20 journaled in identically shaped parallel spaced frame members 21 and 22, respectively, Figs. 2 and 3. One end of the shaft 20 terminates in the frame member 22 while the other end extends through the frame member 21. A pinion gear 23 fixed on the shaft 20 in juxtaposition with the gear 19 is adapted to drive a gear 24 engaged therewith and fixed to a shaft 25, Figs. 2 and 3, journaled in the frame members 21 and 22 respectively. A pinion gear 26 fixed on the shaft 25 in juxtaposition with the gear 24 is adapted to drive a gear 27. The gear 27 constitutes an input to one side of a differential mechanism 28, Fig. 4, and is fixed to a hollow input shaft 29, terminating in a gear 30 fixed thereto. The hollow shaft 29 is supported by an output shaft 31, Fig. 5, journaled in the frame member 21 and extending through a cutout portion in the frame member 22 into a frame member 32 to be journaled therein. A disc 33, Figs. 4 and 5, having two V-shaped cutouts 34 diametrically opposite each other is fixed to the output shaft 31 intermediate of the gear 30 and a gear 35 fixed to a hollow shaft 36 journaled on the output shaft 31. The hollow shaft 36 also has a gear 37 fixed thereto.

The gear 37 is driven by a pinion gear 38, Fig. 2, to constitute a second gear reduction mechanism. The gear 38 is fixed to a shaft 39 journaled in the frame member 32 and extending through the frame member 22 to be journaled in the frame member 21. The shaft 39 extends through the frame member 21 and carries a pulley 40 on this extension driven through a spring belt 41 from a pulley 42 journaled on the shaft 20. By use of the spring belt 41, power is readily available as potential energy stored in the belt 41 thereby providing reliable high speed operation of the counter 10. The pulley 42 is caused to be driven by the shaft 20 by means of a compression spring 43 placed about the shaft 20 to bear against one face of the pulley 42; the other face of the pulley 42 bears against a bushing in the frame member 21. A nut 44 is threadedly engaged with the end of the shaft 20 to bear against the spring 43, to exert sufficient pressure to frictionally establish a driving connection from the shaft 20 to the pulley 42.

However, an escapement wheel 45 fixed to the shaft 39 between the frame members 21 and 22 is controlled by a verge or escapement latch 46 fixed to a shaft 47 journaled in the frame members 21 and 22. The escapement latch 46 is biased by a spring 48 to engage the escapement wheel 45, thereby preventing it from rotation. Hence unless the escapement latch 46 is pivoted about the axis of the shaft 47, the pulley 42 will not be able to drive the pulley 40 through the spring belt 41, the belt will merely slip; but, when the latch 46 is pivoted, the pulley 40 will be driven by the belt 41.

A finger 49 fixed to the end of the shaft 47 extending through the frame member 21 is adapted to engage the tabulating card 12, Fig. 1, carried by the carrier wheel 11. If a card 12 is present, the finger 49 will be held so that the latch 46 prevents the escapement wheel 45 from advancing, but if a card 12 is absent, the finger 49 will drop or pivot clockwise to release the latch 46 from the escapement wheel 45 to allow escapement of one tooth and a finger 50 fixed on the shaft 47 adjacent to the finger 49 is then brought into position to be engaged by the extension 16 of the clips 14 which cams the finger 50 counterclockwise as the carrier wheel 11 rotates and thereby allows the latch 46 to again release the escapement wheel 45 for one tooth escapement. Hence the escapement wheel 45 rotates two teeth for every card 12 that is absent. Of course, the fingers 49 and 50 could be combined into one finger. The movement of the escapement wheel 45 is transferred to the differential mechanism 28 through the second gear reduction mechanism of gears 37 and 38, Fig. 2.

Figure 4:
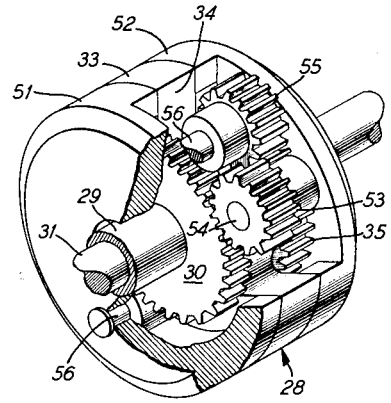
Fig. 4 is a detail view of the differential mechanism of the counter in Fig. 1 with a portion of the output plate removed to show the gearing thereof.
Figure 5:
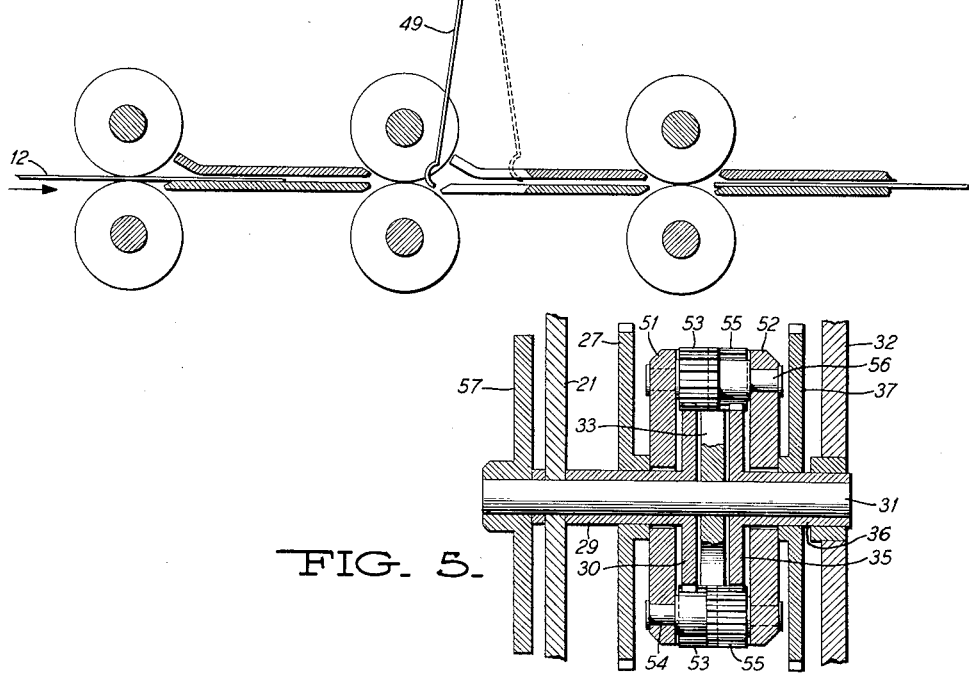
Fig. 5 is a diagrammatic showing of the differential mechanism to further illustrate the connection of the elements thereof.

The dics Fig. 4, is fixed between discs 51 and 52, respectively, the disc 51 having a cutout portion to accomodate a gear 53 journaled on a pin 54 fixed to the disc 52 and extending longitudinally from the face thereof. The gear 53 is in mesh with a gear 55 journaled on a pin 56 fixed to the disc 51 and extending longitudinally from the face thereof, the disc 52 having cutout portion to accommodate the gear 55. Similarly, a set of meshing gears is mounted diametrically opposite from the meshing gears 53 and 55. The gear 53 is also in mesh with the gear 30 and the gear 55 is also in mesh with the gear 35; hence if the inputs to the differential mechanism 28 are equal, there is no output from the differential; however, if there is only an input to one side of the differential 28, the output of the differential equals the input. A cam 57 is fixed on the output shaft 31 adjacent to the left side of the frame member 21 as viewed in Fig. 2 and one revolution of this cam 57 represents a predetermined number of cards. An arm 58, Fig. 1, urged by a spring 59 to follow the cam 57 causes the card hopper, not shown, to index when the arm 58 drops to the low point of the cam 57; this occurs after one revolution of the cam 57. Indexing of the card hopper is described in detail in the aforementioned Patent 2,294,718.

Figure 6:
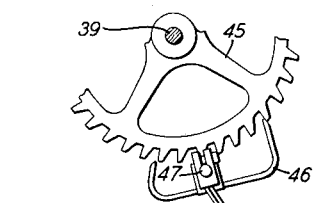
Fig. 6 is a detail view of the control of the escapement for the counter shown in Fig. 1.
Figure 6:
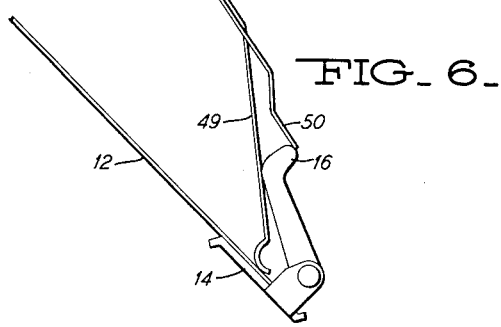

In operation of the counter 10 just described, tabulating cards 12 will be stacked in predetermined numbers. Cards conveyed by the wheel 11 to the stacking position, not shown, engage the tip of the finger 49 as in Fig. 6 to hold the finger 50 from being actuated by the extension 16 of the card clip 14. With the finger 49 held in this position, the latch 46 will be held in engagement with the escapement wheel 45 thereby preventing step-by-step advancement thereof. Since the escapement wheel 45 is prevented from advancing, the shaft 39 will not be rotated and therefore the gear 35 will not be rotated through the second gear reduction mechanism of gears 37 and 38. However, the gear 30 is driven through the first gear reduction mechanism including gears 18, 19, 23, 24, 26 and 27.

Although the pulley 42 is constantly driven by the shaft 20, the spring belt 41 will slip since the escapement wheel 45 prevents the pulley 40 from being rotated.

The gear 30 drives the meshing gear 53 to drive the gear 55 which meshes with the gear 35. However, the gear 35 is not permitted to rotate because the escapement wheel 45 is held stationary by the latch 46. Hence, the gear 55 will revolve about the gear 35 and as it does so, it rotates the output shaft 31 through discs 51 and 33 thereby rotating the cam 57. When a card 12 is missing in the carrier wheel 11 as in Fig. 1, the finger 49 is urged clockwise by the spring 48 to bring the finger 50 into the path of the extension 16 of the clips 14 and in doing so it pivots the latch 46 to allow the escapement wheel 45 to escape one tooth. The extension 16 pivots the finger 50 counterclockwise thereby again releasing the latch 46 to permit the escapement wheel 45 to advance another tooth. Advancement of the escapement wheel 45 drives the gear 35 through the second speed reduction mechanism of gears 37 and 38. The gear 30 will be continuously driven in the manner afore-described. Hence with the gear 35 rotating, the gear 55 will not revolve therearound and therefore, the output shaft 31 will not be rotated. Accordingly, the cam 57 will rotate only when a card 12 is present in the carrier wheel 11 and therefore the number of cards presented to the stacking position will be of a predetermined number at the time indexing occurs.

Figure 7:
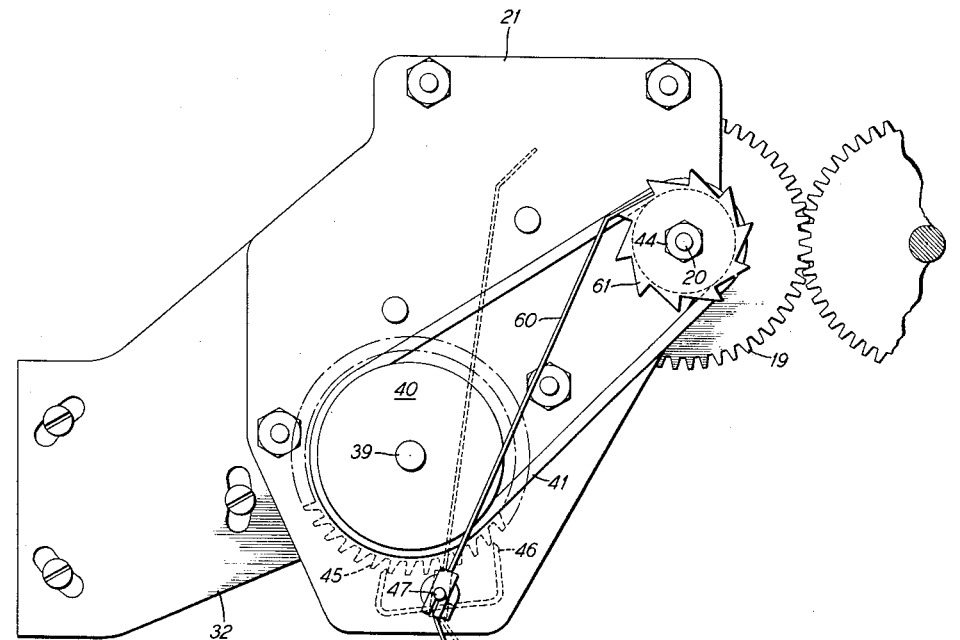
Fig. 7 represents diagrammatically a counting device of an alternate embodiment of the invention.

The alternate embodiment shown in Fig. 7 is substantially of the same construction and principle of operation as the embodiment of Fig. 1. However, if it is not feasible to utilize a member such as the extension 16 of the clips 14 on the carrier 11 to actuate the finger 50 for pivoting the latch 46, a finger 60 fixed to the shaft 47 to replace the finger 50 is adapted in the absence of a card 12 to engage a cam 61 fixed to be rotated by the shaft 20 which is being driven in relationship to movement of the card 12. The cam 61 rotates the finger 60 to release the latch 46 from the escapement wheel 45 to permit it to advance one tooth, and as the finger 60 was allowed to engage the cam 61, the latch 46 released the escapement wheel 45 for the escapement of one tooth. Therefore, in this embodiment the escapement wheel 45 also advances two teeth for every absent card.

In conclusion, it is seen that the invention finds application wherever it is desirable to record a number of events, where the possible number of events is continuously supplied to the recording mechanism and the absence of the event also supplied to the recording mechanism is subtracted from the possible number of events and consequently, only the events actually occurring are recorded. Of course, a bevel gear differential gear mechanism could be used in place of the spur gear differential.

While there have been shown and described and pointed out the funamental novel features of the invention as applied to a preferred embodiment, it will be understood that various omissions and substitutions and changes in the form and details of the device illustrated and in its operation may be made by those skilled in the art, without departing from the spirit of the invention. It is the intention, therefore, to be limited only as indicated by the scope of the following claims.

What is claimed is:

1. A differenial mechanism comprising an escapement mechanism including an escape wheel and an escape latch for controlling step by step movement of said escape wheel, continuously running driving means frictionally urging said escape wheel for movement, a differential mechanism having first and second input drives and an output drive equal to the relative difference in motion between the first and second input drives, means connecting said continuously running driving means to the first input drive of said differential mechanism, means connecting said escape wheel to the second input drive, and means for controlling said escape latch to permit controlled intermittent operation of said second input drive to vary the operation of said output drive, said last named means including a camming means operated by said continuously running driving means for restoring said escape latch each time it effects a operation of said second input drive.

2. In a system for counting articles conveyed along a predetermined path the combination comprising a conveyor having separate article carrying means, means for moving said conveyor, an escapement mechanism including an escape wheel and an escape latch for controlling step-by-step movement of said escape wheel, said escape wheel connected to be frictionally urged for movement by said means for moving the conveyor, a differential mechanism having first and second input drives to provide an output drive equal to the relative difference in movement between the first and second input drives, means for connecting said means for moving the conveyor to said first input drive of the differential mechanism, means for connecting said escape wheel to the second input drive of the differential mechanism, and means connected to said escapement latch and operated by the conveyor to actuate the escapement latch in the absence of an article upon the conveyor and to prevent actuation of said escapement latch in the presence of an article upon the conveyor, said last named means including one member which is adapted to cooperate with the individual articles carried by said conveyor and another member which is adapted to cooperate with the individual article carrying means on said conveyor, said one and another members being alternately effective upon said escapement latch.

3. A differential mechanism comprising: an escapement mechanism including an escape wheel mounted for rotation, as escapement latch disposed to control step-by-step movement of said escape wheel, a lever connected to said escapement latch for actuation thereof to permit step-by-step movement of said escape wheel, a pulley arranged to rotate said escape wheel, a continuously running driving means connected to frictionally drive said pulley, a differential mechanism having first and second input drives combined subtractively to provide an output drive equal to the relative difference in motion between the first and second input drives, a first speed reduction mechanism for furnishing a drive from said continuously running driving means to said first input drive, a second speed reduction mechanism for furnishing a drive from said escape wheel to said second input drive, and constantly rotating camming means for acting upon said lever when the same is permitted to come into engagement therewith, said lever upon being actuated by said camming means actuates said escapement latch in a manner to permit said escape wheel to drive said second input through said second speed reduction mechanism to vary the output of said differential mechanism.

4. In a system for counting articles conveyed along a predetermined path the combination comprising: a conveyor for advancing the articles along the predetermined path, means for moving said conveyor to advance the articles, cam members disposed on said conveyor adjacent each position to be occupied by an article, an escapement mechanism having an associated shaft, an escape wheel mounted on said shaft to rotate the same, a pivotally mounted escape latch disposed to control step-by-step movement of said escape wheel, means for biasing said escape latch to control movement of the escape wheel, a first lever connected to pivot said escape latch and urged by said biasing means to engage said cam members, a second lever connected to said escape latch to engage an article on the conveyor to hold the escape latch in opposition to said biasing means and thereby prevent activation of said first lever by said cam members and to permit activation of said first lever by said cam members in the absence of an article upon the conveyor, a first pulley connected to be driven by said means for moving the conveyor, a second pulley connected to the shaft mounting the escape wheel, a belt threaded about said first and second pulleys for frictionally driving said escape wheel when the escape latch permits movement thereof, a first speed reduction mechanism connected to said means for moving the conveyor, a second speed reduction mechanism connected to said shaft mounting the escape wheel, and a differential mechanism having a first input drive driven through said first speed reduction mechanism at a rate relative to the movement of the conveyor, a second input drive driven through said second speed reduction mechanism at a rate relative to the movement of the escape wheel wherein the movements of the first input drive and second input drive are combined to effect an output drive equal to the difference in relative movements of the first and second input drives.

5. In a system for counting articles conveyed along a predetermined path to a stacking position, the combination comprising a conveyor having separate article carrying means for moving the articles along the predetermined path, means for moving said conveyor to advance the articles to the stacking position, cam members disposed on said conveyor adjacent each article carrying position, an escapement mechanism having an associated shaft, an escape wheel mounted on said shaft to rotate the same, a pivotally mounted escape latch disposed to control step-by-step movement of said escape wheel, means for biasing said escape latch to control movement of the escape wheel, a first lever connected to pivot said escape latch and urge by said biasing means to engage said cam members, a second lever connected to said escape latch to engage an article on the conveyor to hold the escape latch in opposition to said biasing means and thereby prevent activation of said first lever by said cam members and to permit activation of said first lever by said cam members in the absence of an article upon the conveyor, a first pulley connected to be driven by said means for moving the conveyor, a second pulley connected to the shaft mounting the escape wheel, a belt threaded about said first and second pulleys for frictionally driving said escape wheel when the escape latch permits movement thereof, a first speed reduction mechanism connected to said means for moving the conveyor, a second speed reduction mechanism connected to said shaft mounting the escape wheel, a differential mechanism having a first input drive driven through said first speed reduction mechanism at a rate relative to the movement of the conveyor, a second input drive driven through said second speed reduction mechanism at a rate relative to the movement of the escape wheel wherein the movements of the first input drive and the second input drive are combined to effect an output driven equal to the difference in relative movements of the first and second input drives, and an indexing mechanism connected to said output drive for indexing the articles conveyed to the stacking position upon the output drive completing a predetermined movement.

6. A differential counting mechanism comprising an escapement mechanism including an escape wheel and an escape latch for controlling step-by-step movement of said escape wheel, continuously running driving means connected to frictionally urge said escape wheel for movement, a differential mechanism having a first input drive connected to said continuously running driving means, and second input drive connected to said escape wheel, the movements of said first and second input drives being combined subtractively so that the output drive of the differential mechanism equals the relative difference in motion between the first and second input drives, and camming means mounted to be driven by said continuously running driving means and adapted to actuate said escape latch when the same engages said camming means to permit operation of said second input drive to vary the output of said differential mechanism.

References Cited in the file of this patent
UNITED STATES PATENTS

| | | |
|---|---|---|
| 1,273,897 | Matteson | July 30, 1918 |
| 2,294,718 | Carroll | Sept. 1, 1942 |
| 2,781,975 | Pudelke et al. | Feb. 19, 1957 |

FOREIGN PATENTS

| | | |
|---|---|---|
| 722,353 | Great Britain | Jan. 26, 1955 |

UNITED STATES PATENT OFFICE
CERTIFICATE OF CORRECTION

Patent No. 2,974,862                         March 14, 1961

Robert N. Eichorn

It is hereby certified that error appears in the above numbered patent requiring correction and that the said Letters Patent should read as corrected below.

Column 4, line 11, for "dics" read -- disc 33, --; column 6, line 12, for "as" read -- an --.

Signed and sealed this 26th day of September 1961.

(SEAL)
Attest:

ERNEST W. SWIDER                        DAVID L. LADD
Attesting Officer                          Commissioner of Patents
                                                              USCOMM-DC